(12) United States Patent
Bell et al.

(10) Patent No.: US 7,778,889 B2
(45) Date of Patent: Aug. 17, 2010

(54) MODULAR E-COMMERCE WEB SITE DEVELOPMENT SYSTEM

(75) Inventors: Derrick Bell, San Rafael, CA (US); John Binns, Sausalito, CA (US); Barry Cline, Sonora, CA (US); Jim King, Mill Valley, CA (US); George Kniga, San Francisco, CA (US); Marilyn Murtha, San Rafael, CA (US); Paula George Tompkins, Sausalito, CA (US)

(73) Assignee: The SoftAd Group, LLC, Dearborn, MI (US)

( * ) Notice: Subject to any disclaimer, the term of this patent is extended or adjusted under 35 U.S.C. 154(b) by 531 days.

(21) Appl. No.: 11/245,371

(22) Filed: Oct. 6, 2005

(65) Prior Publication Data

US 2006/0031147 A1  Feb. 9, 2006

Related U.S. Application Data

(63) Continuation of application No. 09/653,487, filed on Aug. 31, 2000, now abandoned.

(51) Int. Cl.
*G06F 17/30* (2006.01)
(52) U.S. Cl. .......................................... 705/27; 705/26
(58) Field of Classification Search ............... 705/26–27
See application file for complete search history.

(56) References Cited

U.S. PATENT DOCUMENTS 6,330,575 B1 * 12/2001 Moore et al. ................ 715/234
6,484,149 B1 * 11/2002 Jammes et al. ................ 705/26
6,684,369 B1 * 1/2004 Bernardo et al. ............ 715/205

OTHER PUBLICATIONS

SoftAd: Internet:Wayback Machine, www.archive.org; www'.softad.com; Apr., May 1999; May 1998, 14pgs.*
Tech Data: Harrington, Jeff; "A look at an extranet," St. Petersburg Times, Mar. 29, 1999; Proquest #40166659, 3pgs.*

* cited by examiner

*Primary Examiner*—Robert M. Pond
(74) *Attorney, Agent, or Firm*—Fliesler Meyer LLP

(57) ABSTRACT

A system in accordance with the invention creates a predesigned software product generally for e-commerce applications that is modifiable by a company-user in terms of not only look and feel, but also functionality and flow. Such a system includes a set of predesigned business modules where each business module performs a unique function. Each business module is accompanied by a respective set of templates, each of which models a web page. Within each template is embedded one or more commands. To customize its system, the company-user (1) selects which business modules it desires, (2) selects which templates it desires to use with each business module, and (3) customizes each template in terms of look and feel. By selecting the modules, the company-user determines the system's overall functionality, and by selecting the templates, the company-user determines the look and feel and flow of the system. Once customized, the company-user populates a database for use of the system with company-specific data.

20 Claims, 11 Drawing Sheets

MODULAR E-COMMERCE WEB SITE DEVELOPMENT SYSTEM

CLAIM OF PRIORITY

This application is a continuation of U.S. patent application Ser. No. 09/653,487 entitled "Modular E-Commerce Web Site Development System" by Bell et al., filed Aug. 31, 2000.

FIELD OF THE INVENTION

The invention generally relates to an e-commerce system, and particularly to a web site software system that is modular and easily customizable.

BACKGROUND

Within the past decade, use of the Internet has exploded. Internet users can find information, make purchases, and participate in discussion groups all by using a browser such as Netscape Communicator or Internet Explorer from their home or office computer. To do so, once connected to an Internet service provider (ISP) an Internet user simply enters a domain name in the browser and is brought (through his/her browser) to an appropriate web site. Each web site is composed of one or more web pages which convey information to the Internet user.

While the growth of the Internet has been enormous, growth of the Internet in relation to e-commerce has been significant. For instance, in 1999 on-line purchases during the holiday season were estimated at $7 billion while in 1998 such purchases were only near $2.3 billion.

Given the recent explosion in e-commerce, more and more businesses are seeking to both institute e-commerce web sites as well as upgrade existing sites. To assist in this undertaking, a number of companies have developed web site software products to enable a company-user to set up a web site for its e-commerce business. Typically, these software products come in two forms: (1) a full-custom program or (2) a "shrink-wrapped" program.

A full-custom program is designed to satisfy the specific needs of a single particular user. A full-custom program must therefore be written more or less from scratch and will typically be rather complicated, expensive, and time-consuming to implement, often taking over a year to develop and containing many thousands of lines of code.

The second type of programs mentioned are shrink-wrapped programs. A shrink-wrapped program is a fully-developed program that is purchased "as-is" "off-the-shelf." Such programs may include catalog software that enables the purchaser to quickly and easily set up an on-line catalog or product display/description. While such shrink-wrapped products are quick and relatively inexpensive compared to their full-custom counterparts, they offer little to no flexibility to the user-purchaser. In other words, the user will have little ability to change the look and feel of its web site and generally cannot alter the flow or organization of how the web site is presented at all.

Therefore, it is desirable to create a product that allows customization for the user, but can do so for less time and less money than typical full-custom programming.

SUMMARY

A system in accordance with the invention creates a modular software product generally for e-commerce applications that is modifiable by a company-user in terms of not only look and feel, but also functionality and flow. Such a system includes a set of business modules where each business module performs a specific function. Each business module is accompanied by a respective set of templates, each of which models a web page. Within each template is embedded one or more commands. To customize its system, the company-user (1) selects which business modules it desires, (2) selects which templates it desires to use with each business module, and (3) customizes each template in terms of look and feel. By selecting the modules, the company user determines the system's overall functionality, and by selecting the templates, the company user determines the look and feel and flow of the system. Once customized, the company-user populates a database for use with the system with company-specific data.

A system in accordance with the invention is also highly modular. Each of the business modules functionally operates independently of one another, although one may receive data derived from another. Further, modules can be added or subtracted from the system depending on the company-user's business. To provide such modularity, the system is built on a foundation that houses functionality common to the modules. When a module is added to the system, no other modules are affected and the foundation is only minimally modified.

A system in accordance with the invention is useful for modeling a sales environment. In one embodiment, such a system is designed to assess an end-user's needs, display product information, allow an end-user to design his/her own products, allow an end-user's comparison of products, display promotional information, display financing information, locate a company partner, process a transaction, build loyalty through membership and personalization, and provide end-user access to company partner web-sites.

BRIEF DESCRIPTION OF THE DRAWINGS

The present invention is described with respect to particular exemplary embodiments thereof and reference is accordingly made to the drawings in which.

DETAILED DESCRIPTION

A system in accordance with the invention provides software for use in an e-commerce environment. In particular, a system in accordance with the invention includes a modular software package that can be customized to a large extent by the company-user in considerably less time and for less money than a full-custom alternative while providing considerably more flexibility than a shrink-wrapped alternative. A system in accordance with an embodiment of the invention is designed to provide an Internet-based model of a real-world sales environment to enable end-users to browse and select products from an on-line catalog, select one or more dealers, and to send a faxed, e-mailed, or XML formatted request-for-quote (RFQ) to the selected dealer to facilitate the end-user's purchase decision. In some embodiments, a system in accordance with the invention will further assess an end-user's needs, compare one product to another, initiate purchases, provide promotional information, configure products, and build customer loyalty.

Overview

Figure 1:
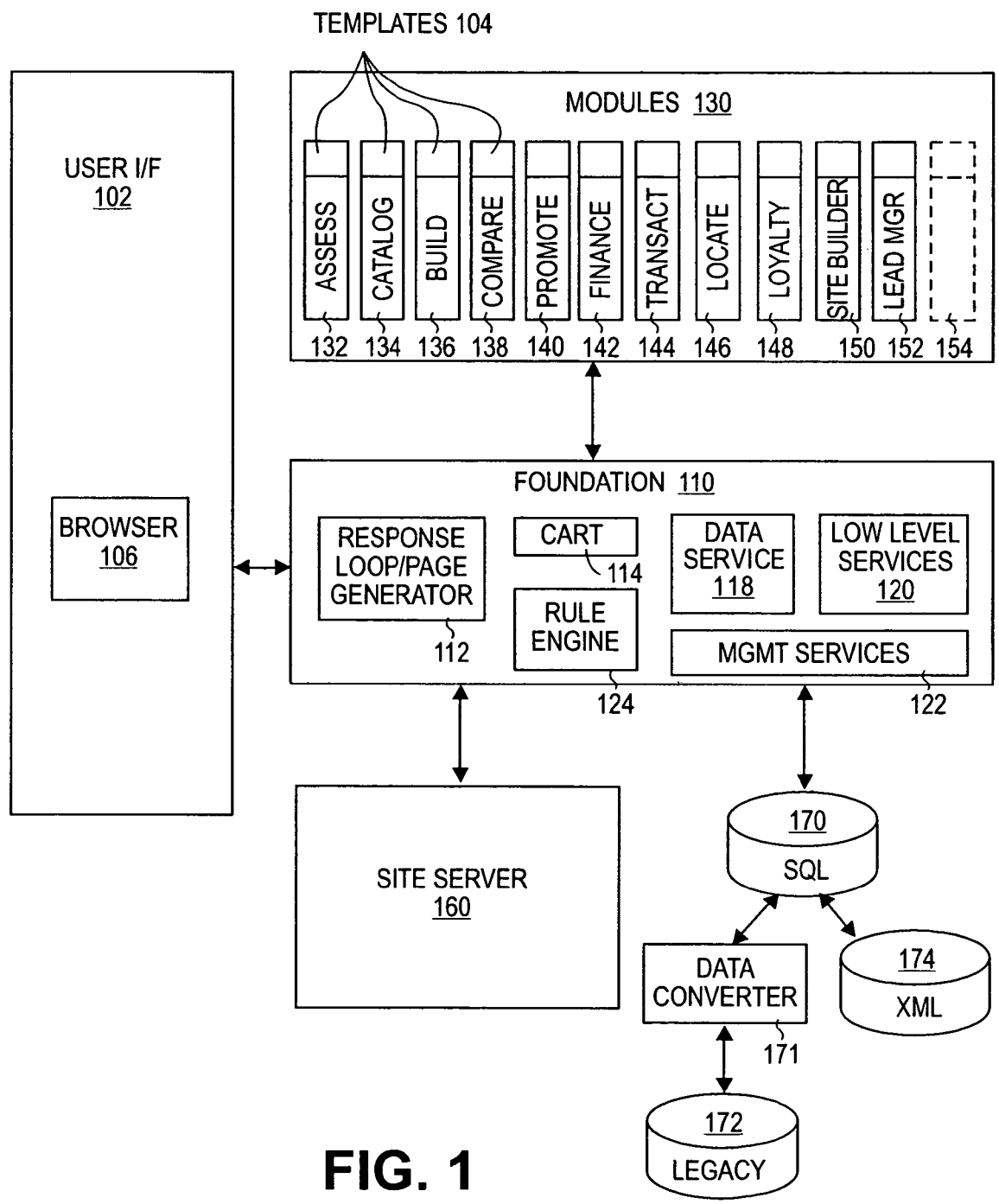
FIG. 1 is a generalized function block diagram of a system in accordance with the invention.

FIG. 1 shows a general overview of a system 100 in accordance with the invention. Such a system includes a user interface 102. User interface 102 includes browser 106, such as Netscape Communicator or Internet Explorer. Browser 106 is used by an end-user, such as a customer or potential customer of a company-user to view the company's web site.

As used herein, the term "company-user" refers to the entity that is using an embodiment of the invention to develop and maintain a web site. The company-user will typically employ an "administrator" to perform the development and maintenance of the web site. Thus, any reference herein to action taken by the company-user will be understood to typically be ultimately implemented on the web site by the administrator. The term "end-user" refers to a person other than an administrator accessing the company-user's web site through a browser. An end-user is often a customer, potential customer, or individual acting on behalf of a customer (such as a company-user employee assisting a customer).

Modules 130 determine the overall functionality of the system. Each module contains different functionality and operates independently of one another. Because of their relationship to various occurrences in business, modules 130 are sometimes referred to herein as "business modules." Modules can be removed or added to the system with minimal changes to the overall system and allow the system functionality to be customized. Each module 130 is associated with a unique set of templates 104 used by a company-user (by way of an administrator) of the system to customize and tailor the system to its own needs. Templates can be used and viewed by a company-user through a browser 106. Further information with respect to templates will be discussed later.

As illustrated in FIG. 1, in one embodiment modules 130 are directed to creating an e-commerce sales environment. For instance, catalog module 134 provides the company-user with the ability to display products and/or product information on-line, while locate module 146 finds the end-user's local company partner. As used herein, a "company partner" is any dealer, retailer, distributor, or other entity that is affiliated with the company-user or otherwise assists the company-user in the sale or distribution of its products or services. Details of these modules 130 will be discussed later.

Business modules 130 interact with foundation 110. Foundation 110 is essentially the infrastructure for the system 100, including the services commonly required by the modules 130, such as response loop 112, cart 114, data services 118, and rule engine 124, each of which will be later described in more detail. Although cart 114 is included in foundation 110, cart 114 behaves like a business module 130 and is only included in foundation 110 because it is utilized by a number of modules 130. In addition to services commonly required by modules 130, foundation further includes various low level services 120 and management services 122 for system administration. Overall, foundation 110 creates a flexible infrastructure for rapid and cost-effective incremental installations of modules, which can be added or replaced to respond to a user company's business needs. Thus, foundation 110 provides scalability and information sharing among the modules.

Site server 160 is based on Microsoft Site Server or Commerce Server, both products known in the art, or other similar product. Site server 160 maintains a Directory Information Tree (DIT) that includes end-user information (including name, address, phone, etc.) and other frequently read data.

In addition to that in Site Server, other data stores are provided. In particular, these data stores include SQL database 170, legacy database 172, and XML information 174. SQL database 170 is a typical database used with the system in accordance with the invention. Legacy database 172 would be used, for instance, if a company-user prior to acquiring a system in accordance with the invention, already had a database system with stored data. The legacy data is converted using data converter 171 into a useable format and accessed through the SQL database 170. For instance, in some embodiments, the company-user creates a data extract for legacy data, and the extracted data is used by data converter to populate SQL database 170. Similarly, XML data 174 provides an industry-standard method for exchanging data with SQL databases 170. Thus, as described for one embodiment, data for use in the system is stored, or converted and stored, in SQL database 170 (except for data in site server 160).

General System Operation

Figure 2:
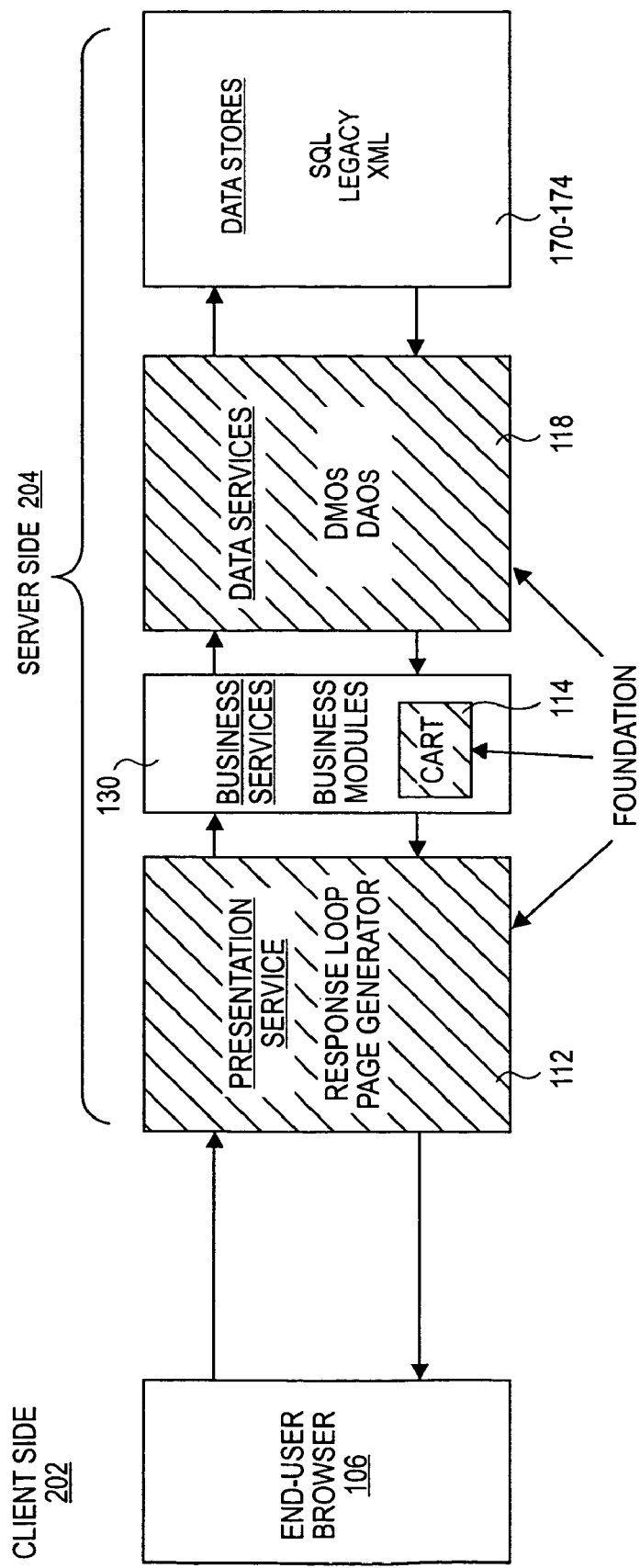
FIG. 2 is a generalized diagram illustrating general operation of a system in accordance with the invention.

Referring now to FIG. 2, a general flow for the system is described. An end-user will generally access a web site developed using an embodiment of the invention through a web browser 106 on a client machine 202. When an end-user initiates a request (typically through a button or a field provided on a web page), the request is communicated to a server 204 through foundation 110. In particular, the end-user request initiates a "response loop" 112, which is part of the "presentation services" for the system. Response loop 112 initially processes the request and selects an appropriate business module 130 to carry out the request whose functionality correlates to the request. An object for the appropriate module 130 is instantiated and further processes the request and calls data services 118, located in the foundation, to collect the requested data from data storage 170-174. Data services 118 retrieve and save data for modules 130 from/to persistent storage.

Once data is retrieved, it is returned to the appropriate module 130, which in turn returns the information to the response loop 112. The response loop 112, through a page generator, then generates an appropriate responsive web page displayed to the end-user through the end-user's browser.

In sum, a system in accordance with the invention operates as a series of successive cycles, where each cycle consists of request data being entered by the end-user on the client machine through a browser and converted into a specific request for information from the data stores. The flow then reverses as the requested information is returned. Each cycle culminates when an appropriate response to the request is formatted and sent back to the browser for the end-user to view. The end-user reacts to what he/she sees and the process repeats. This repeated cycle comprises most of the activity in the system.

Response Loop/Page Generator

Figure 3:
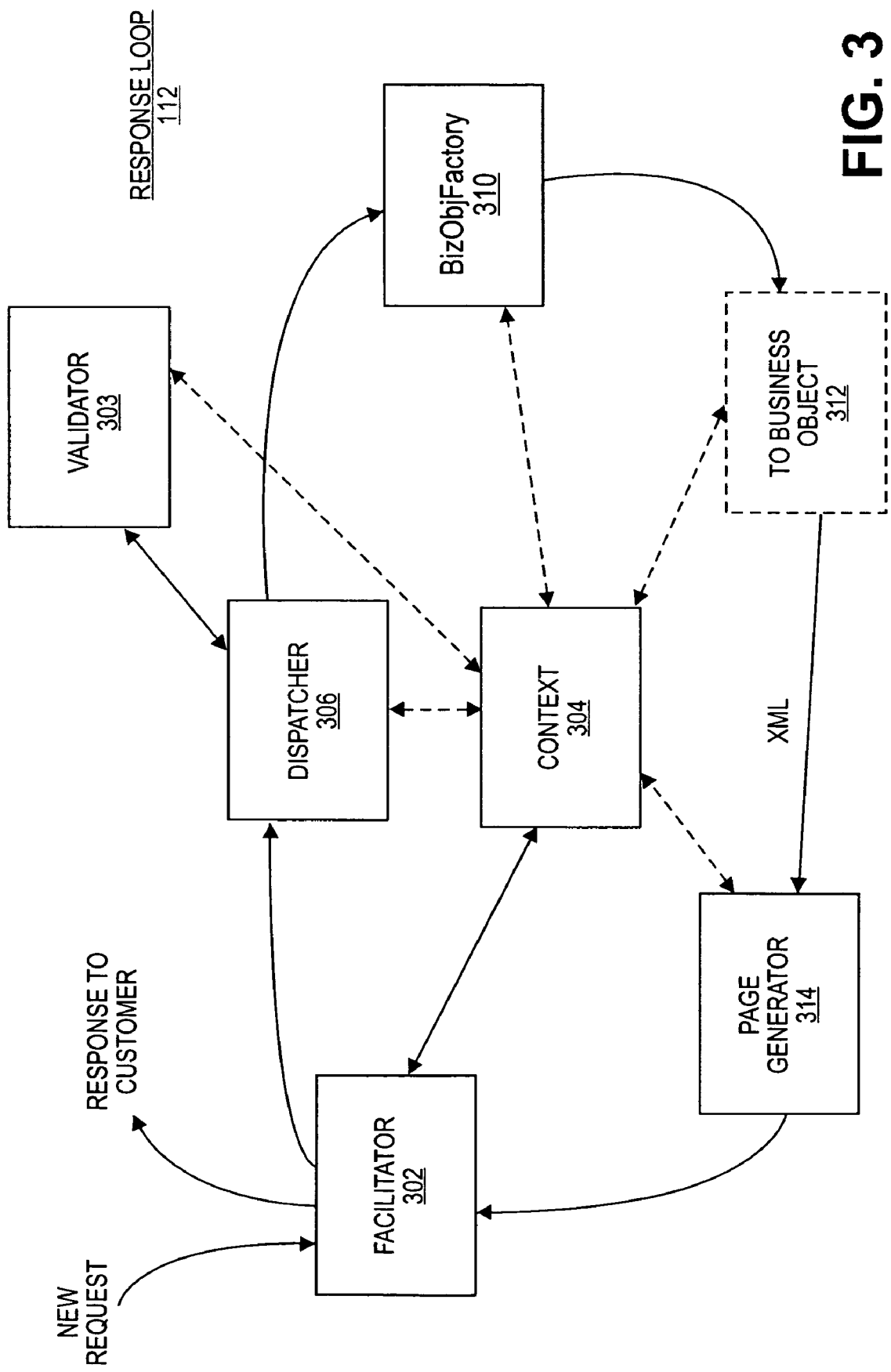
FIG. 3 is a generalized block diagram of a response loop used in an embodiment of the invention.

Now referring to FIG. 3, the response loop 112 is described in further detail. When a new request (initiated by an end-user) is received, a facilitator object 302 is instantiated. The facilitator has one method: execute. All commands (including administrative commands) are sent into the system through this method in one embodiment. The execute method typically has the following signature:

Facilitator.execute (string module, string action, string criteria, string template, string debug).

"Module" names the business module for which an object is to be invoked. "Action" represents the action to be carried out by the business module object. "Criteria" represents any variable parameters required for the action. "Template" specifies an XSL style sheet to be returned. The "template" parameter is optional and only included in some embodiments. It is an empty string by default. And "debug" specifies logging and tracing to be activated.

This execute method creates a context object 304 for the individual request. The context object 304 stores and holds information for each request and exists for the life of the request. When the context object is instantiated, the parameters from the Facilitator execute method are copied into the object. During the life of the request, the context object stores the state of the request. Other objects in the response loop will later consult with and update the context object for this particular information as shown by the dashed lines.

Once the relevant initial request data is stored in context object 304, the facilitator's execute method initiates a dispatcher object 306 and passes the context object to it. The dispatcher object 306 takes the context object and invokes a validator object 308 to validate the information contained in the context object 304. The validator verifies the attributes of the context object against a grammar repository in the DIT before further operation. If an error is found by the validator 308, the dispatcher 306 sends a message to an error handler in the foundation low level services 120. But if no errors are found by the validator 300, then dispatcher 306 invokes a Business Object Factory (BizObjFactory) 310. BizObjFactory 310 consults the context object 304 to determine the type of module 130 required. BizObjFactory 310 then instantiates a business object 312 corresponding to the appropriate module 130. Business object 312 is shown in phantom since it is not necessarily part of the foundation (unless it is cart 114). Business object 312 then performs the necessary functionality, and if necessary, uses data services 118 to obtain data from an appropriate data store.

The business object 312 then converts any data it has retrieved into XML format, invokes the page generator 314, and sends the XML data to page generator 314. Page generator 314 consults the context object 304 to obtain an XSL style sheet (described below) appropriate to illustrate a response to the end-user. Page Generator 314 combines the retrieved XSL style sheet with the XML data and produces an HTML web page, storing the HTML result in the context object. The web page is then output to the end-user's browser.

System Customization

A system in accordance with the invention can be easily customized by a company-user. In a first level of customizability, the company-user selects which business modules 130 it desires in its system. In the some embodiments, business modules will be produced by one or more third-party companies, the supplier of the foundation, or could even be defined or designed by the company-user. In many embodiments, a company-user may start out with a selected subset of possible modules and then add (or subtract) modules over time. On installation of a module, none of the other modules are effected, and the foundation is only minimally effected with the addition of information to recognize the new module, for instance, information used in the response loop to validate requests and to call selected modules.

Each module 130 has a set of templates associated with it, each template representing a model of a web page, or a generic web page. The company-user selects which template it desires to use, a second level of customizability, and then forms a web page by customizing the selected template, a third level of customizability.

Figure 4:
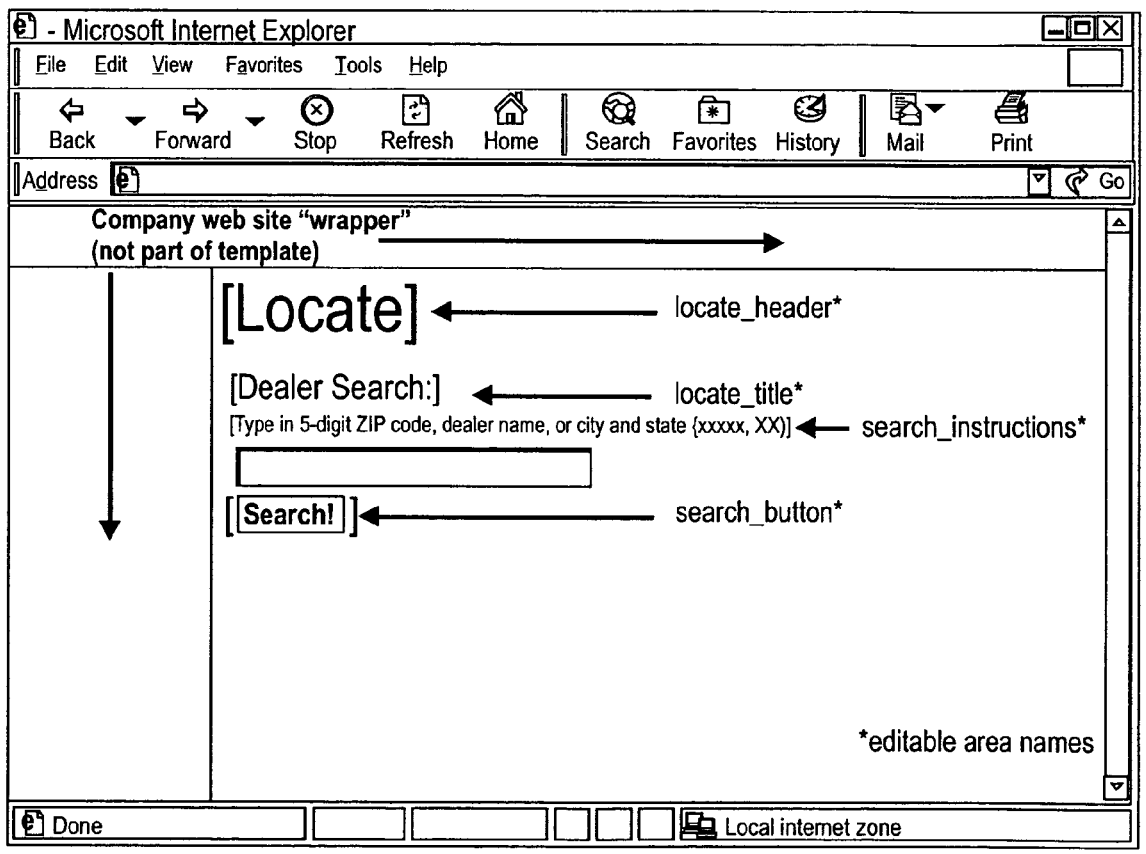
FIGS. 4 and 6-8 illustrate example templates used in one embodiment of the invention.
Figure 6:
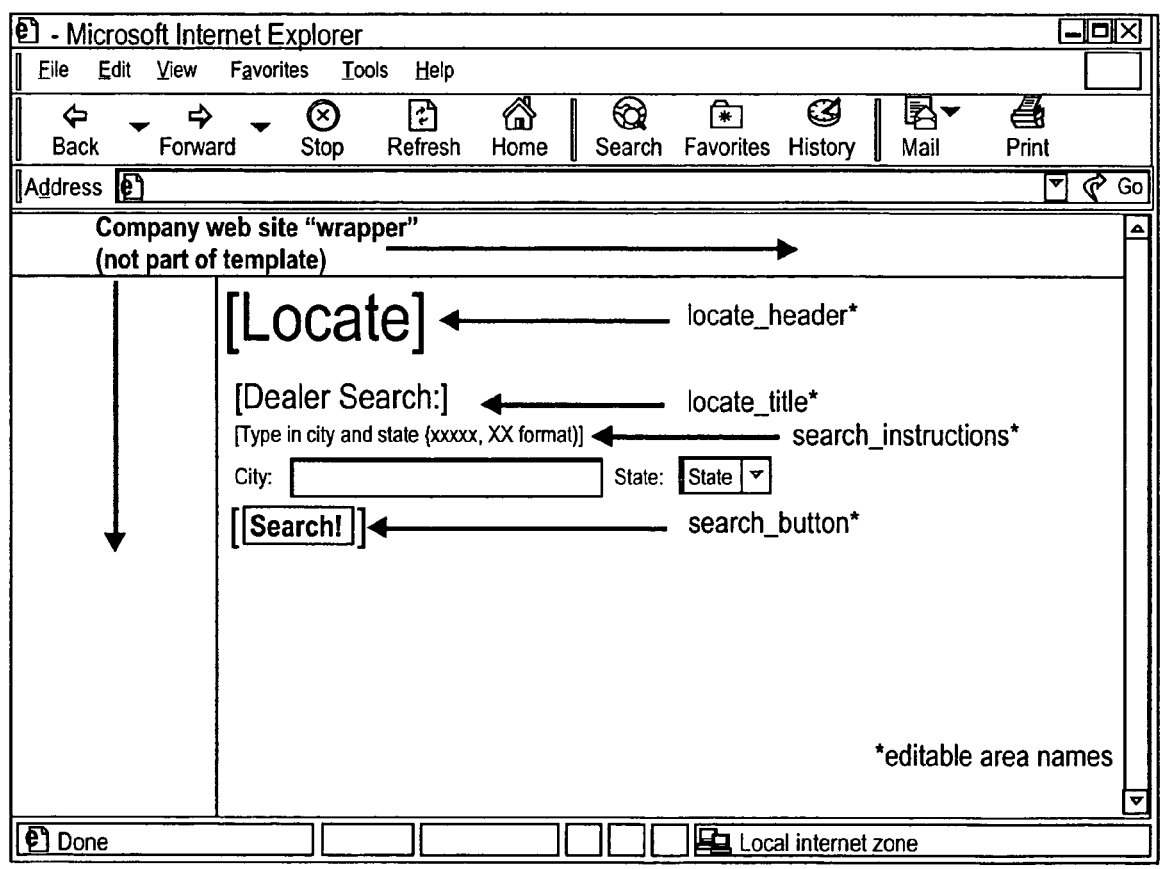
Figure 7:
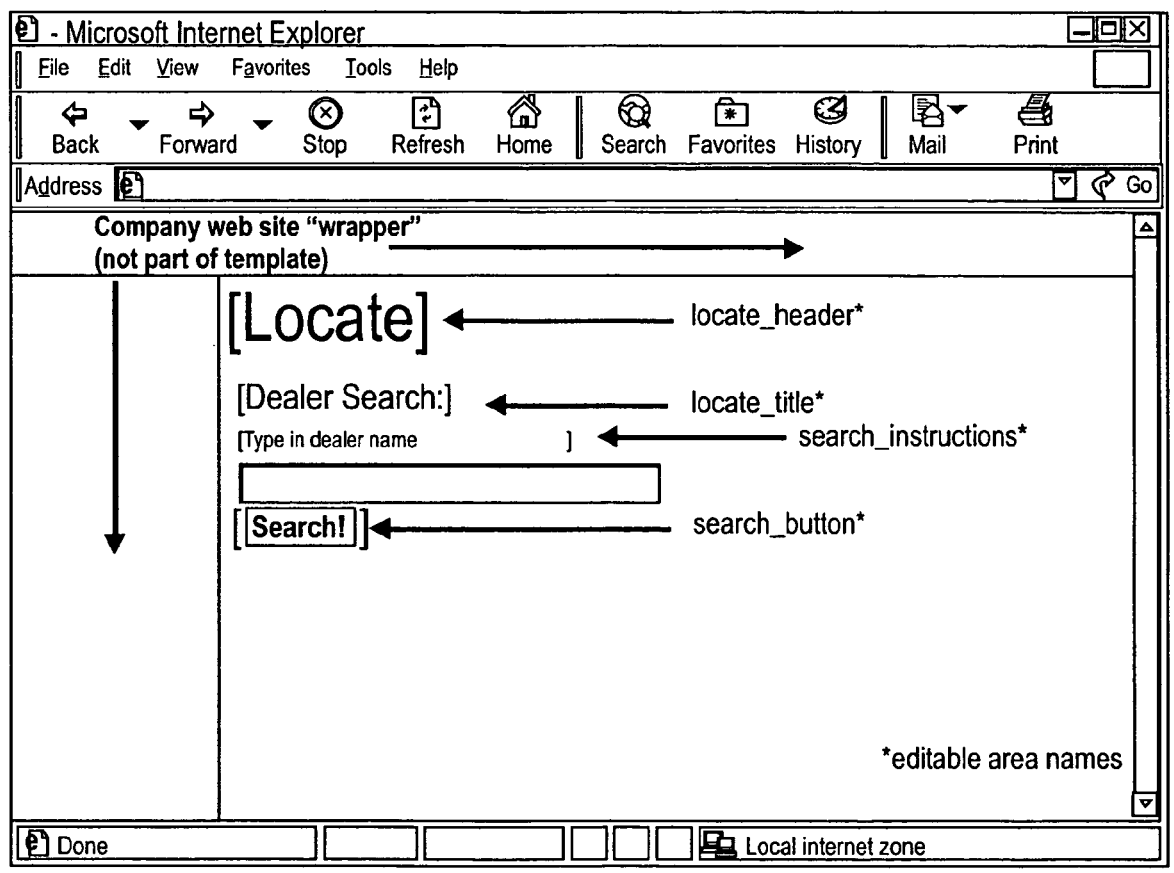
Figure 8:
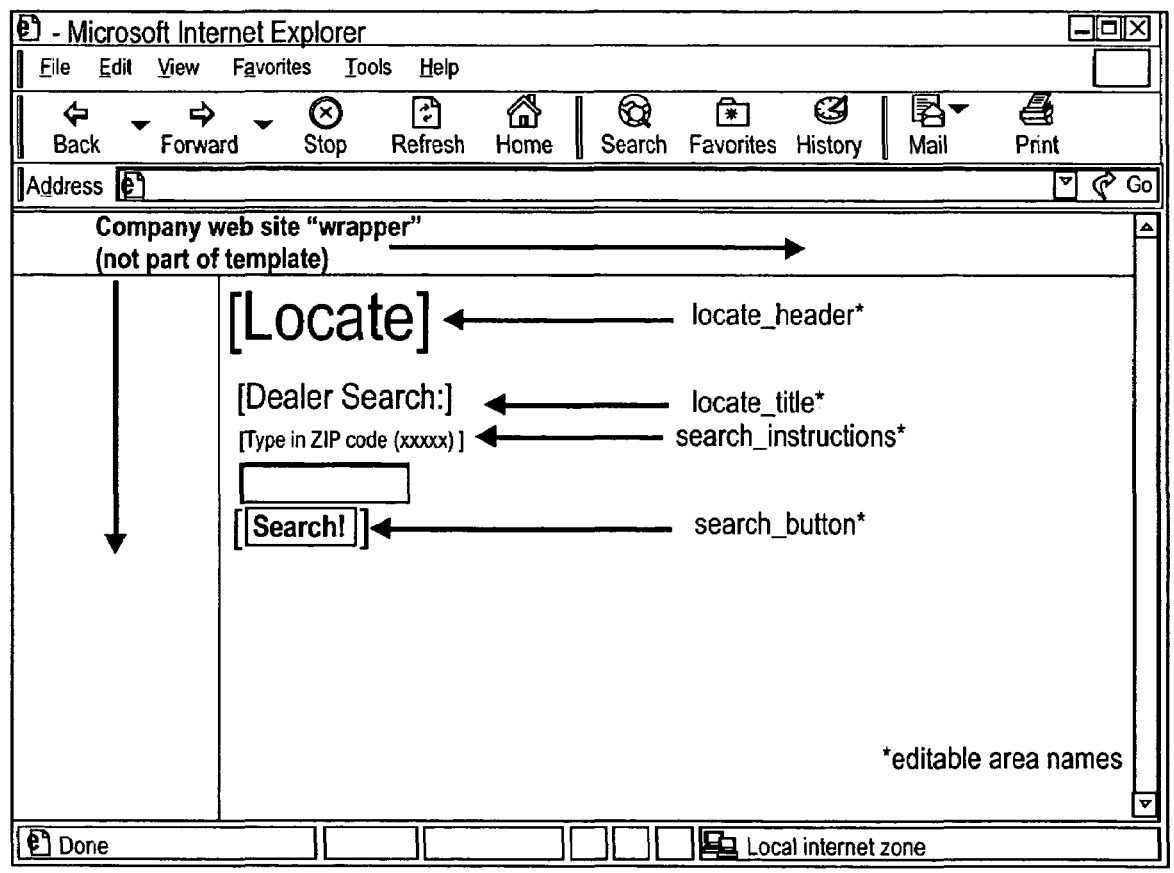

In particular, in one embodiment templates are XSL style sheets that determine the look and feel for a particular web page. As used herein, "look and feel" refers to the graphic design elements of a web page, including but not limited to, layout, color, font, size, titles, text, graphics, and button styles. Templates are generically designed to allow use in a variety of business situations. Templates include placeholders for titles, headers, and buttons. An example template that might be used in one embodiment with "locate" module 146 is shown in FIG. 4. Other example templates that might be used to replace that shown in FIG. 4 are shown in FIGS. 6-8. Each of these templates vary slightly from one another, particularly in the information they are to search for (e.g., zip code, dealer name, city, state, etc.). While the templates shown in FIGS. 4 and 6-8 are relatively simple in appearance, more complex templates could be easily provided. Hence, part of the web site customization process includes selecting which templates the company-user believes are most suitable for conveying relevant information to its end-users.

Figure 5:
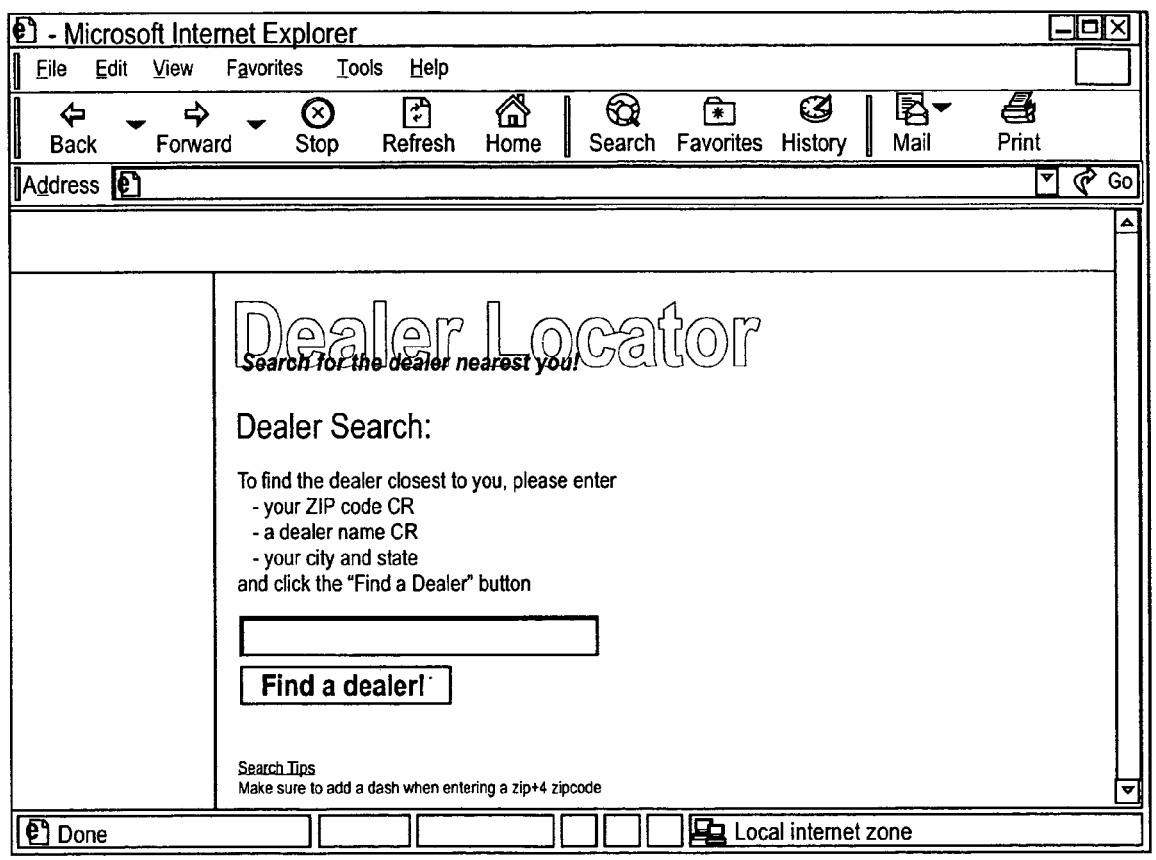
FIG. 5 illustrates an example of the template of FIG. 4 customized.

The look and feel of each of these generic templates can be customized and thus tailored to be used for a particular company-user, but without the time and effort to create a page from scratch. For instance, font, sizes, layout, and styles can be edited. Also selected areas can be stylized, for instance headers and titles can be replaced with graphic text and images. Button styles and color schemes can also be edited. An example of the template of FIG. 4 as customized is illustrated in FIG. 5. Thus, considerable flexibility is provided to the company-user to customize its web pages. Still, despite this flexibility, a few elements cannot be validly eliminated such as any required input fields and buttons to allow the page to function properly. Still, the placement, size, and look of these required elements can be altered.

In one embodiment of the invention cascading style sheets (CSS) are utilized. CSS provide the advantage of being able to change font type, sizes, and style across an entire template family simply by editing a single CSS style sheet rather than revising each template individually.

Thus, the company-user decides which templates best suit the company-user's needs. The company-user can then change colors, add company-specific graphics, icons, and fonts and make adjustments to the layout appearance. Customized templates are saved as a new XSL file that will be used by the page generator 314 to provide information to an end-user.

Within each template is embedded one or more commands. By selecting certain templates or changing templates, the commands used with the system (and thus the functions performed by the system) can be altered, thereby allowing easy alterability of the system's functionality and flow.

For instance, the following command may be included in a "locate" template (a template for use with locate module 146):

| COMMAND NAME | COMMAND FORMAT |
| --- | --- |
| LocateByZip | OFacilitator.Execute ("Locate", "LocateByZip", criteria, style), | where "Locate" represents the module to carry out the command, "LocateByZip" represents a specific command or action, and "criteria" represents variable parameters for the command, e.g., a zip code (such as 94941) entered by an end-user. The "style" parameter is optional and only used in some embodiments, but in one embodiment it is a string containing the complete pathway to a particular responsive style sheet, allowing the company-user to "override" a default style sheet. The result of this particular command is the retrieval of a list of company partners proximate to a particular zip code. Thus, when a request for information is entered by an end-user e.g., through buttons or fields on a customized template (the web page), the request is provided to the system in the form of a command such as that shown above.

Other examples of commands that may be used in one embodiment with "locate" templates include:

| COMMAND NAME | COMMAND FORMAT |
| --- | --- |
| LOCATE COMMANDS | |
| LocateByZip | OFacilitator.Execute ("Locate", "LocateByZip", criteria, style) |
| LocateByZipXact | OFacilitator.Execute ("Locate", "LocateByZipXact", criteria, style) |
| LocateByCityState | OFacilitator.Execute ("Locate", "LocateByCityState", criteria, style) |
| LocateByDealer | OFacilitator.Execute ("Locate", "LocateByDealer", criteria, style) |
| LocateDriveMapForm | OFacilitator.Execute ("Locate", "LocateDriveMapForm", criteria, style) |
| GetDriveMap | OFacilitator.Execute ("Locate", GetDriveMap", criteria, style) |
| GetLocalMap | OFacilitator.Execute ("Locate", "GetLocalMap", criteria, style) |
| GetNext | OFacilitator.Execute ("Locate", "GetNext", criteria, style) |
| GetNextPick | OFacilitator.Execute ("Locate", "GetNextPick", criteria, style) |
| ShowPage | OFacilitator.Execute ("Locate", "ShowPage", criteria, style) |

Other examples of commands for other modules include:

| COMMAND NAME | COMMAND FORMAT |
| --- | --- |
| CATALOG COMMANDS | |
| GetCross | OFacilitator.Execute ("Catalog", "GetCross", criteria style) |
| GetProduct | OFacilitator.Execute ("Catalog", "GetProduct", criteria style) |
| GetProductSKU | OFacilitator.Execute ("Catalog", "GetProductSKU", criteria style) |
| ReadCategory | OFacilitator.Execute ("Catalog", "ReadCategory", criteria style) |
| SearchProduct | OFacilitator.Execute ("Catalog", "SearchProduct", criteria style) |
| SearchProductCount | OFacilitator.Execute ("Catalog", "SearchProductCount", criteria style) |
| SearchProductLimit | OFacilitator.Execute ("Catalog", "SearchProductLimit", criteria style) |
| SearchProductXML | OFacilitator.Execute ("Catalog", "SearchProductXML", criteria style) |
| ShowPage | OFacilitator.Execute ("Catalog", "ShowPage", criteria style) |
| CART COMMANDS | |
| AddProduct | OFacilitator.Execute ("Cart", "AddProduct", criteria style) |
| AddDealer | OFacilitator.Execute ("Cart", "AddDealer", criteria style) |
| GetCompleteCart | OFacilitator.Execute ("Cart", "GetCompleteCart", criteria style) |
| GetStoredCart | OFacilitator.Execute ("Cart", "GetStoredCart", criteria style) |
| GetCartProducts | OFacilitator.Execute ("Cart", "GetCartProducts", criteria style) |
| RemoveProduct | OFacilitator.Execute ("Cart", "RemoveProduct", criteria style) |
| RemoveDealer | OFacilitator.Execute ("Cart", "RemoveDealer", criteria style) |
| ClearCart | OFacilitator.Execute ("Cart", "ClearCart", criteria style) |
| ClearCartProducts | OFacilitator.Execute ("Cart", "ClearCartProducts", criteria style) |
| TRANSACT COMMANDS | |
| RFQ Action | OFacilitator.Execute ("Transact", "RFQ", criteria style) |
| ShowPage | OFacilitator.Execute ("Transact", "ShowPage", criteria style) |

Thus, a relatively small set of commands is used to create a customized system, where the commands are easily selected through the selection of templates.

A system in accordance with the invention can further be customized using the rule engine 124 (FIG. 1). The rule engine 124 allows the system to perform in a way unique to each company-user by allowing a company-user to develop sets of performance-defining rule. An example of a rule, expressed in some unspecified syntax, is:

if customer is young and customer lives somewhere hot then an open-top vehicle should be considered Rule can be generated automatically, by the system, or manually, by the company-user. Rule could be generated automatically, for instance, by examining the structure and contents of the catalog database to generate rule used by the build module (which allows end-users to design products) or by the assess module (which assesses an end-users needs and provides product recommendations). Manual rule generation (e.g., done by an administrator for the company-user) can be done with tools similar to those provided by Microsoft in their various e-mail clients, by allowing rule to be built with point and click techniques. Hence, business rule can be added to the system dynamically, without a requirement for changing application code.

A system in accordance with the invention is further customizable in that it allows for "back-end integration." In other words a system in accordance with the invention provides the ability of the system to integrate with other third party systems by allowing the present system to send data out to and get data back from other third party systems. Typically such data communication will be done using XML data. For instance, an object for the transact module 144 may pass order information (e.g., a representation of the cart) in the form of an XML document (via a DAO, discussed later) to a third party order fulfillment system that performs inventory control, shipping, etc. Similarly, the transact module could receive information in XML format from the same order fulfillment system indicating a ship date, which information could then be provided to the end-user. By way of further example, an object for location module 146 could receive XML data from a map provider.

Other Foundation Services

Cart 114 (FIG. 1)

Cart 114 is essentially a module akin to business modules 130, but because it is used by many other modules 130, it is located in foundation 110. Cart 114 can store information sufficient to define a product order and present it to the company-user or to company partners for price quoting. Thus, as is understood in the art, cart 114 is a mechanism for temporary storage that either holds, or provides access to, information identifying the customer, the company partner (if any) from whom the customer wishes to perform the transaction, and the products or services ordered.

As with the other business modules, an object for cart 114 is invoked by the response loop. The cart object consults with the context object and performs the appropriate specified action. When the action is complete, including gathering data through use of data services 118, then the cart object forwards XML data to the page generator to format it and return it to the end-user's browser.

Data Services 118

Data Services 118 is a server-based set of components whose primary responsibility is to retrieve and save data for the modules 130 from and to persistent storage. The primary components of Data Services 118 are data access objects (DAOs).

DAOs are the only objects in the system that have "knowledge" about how data is stored. DAOs effectively insulate the rest of the system from the specifics of data handling.

DAOs interact directly with the data stores (e.g., SQL database 170, the DIT, or with outside data services such as map providers).

A DAO is initiated by an object correlated to a business module 130 (including cart 114), e.g., locate, catalog, transact. Once initiated, the DAO interfaces with the appropriate data store to store/retrieve information.

In some embodiments, data management objects (DMOs) are used in some instances in conjunction with DAOs. DMOs essentially manage DAOs and can be used to encapsulate or "wrap" a number of related DAOs. For instance, a DMO may encapsulate a DAO that retrieves data from the SQL database 120 and a DAO that retrieves data from the DIT when both DAOs are for use with the catalog module. An object for the catalog module can then simply call the DMO, which then directs the call to the appropriate DAO.

Low Level Services 120 (FIG. 1)

The foundation 110 also includes a number of low level services, including error handling, message handling, and security. Low level services further include a "customer object" which stores and retrieves end-user information from the DIT. Low level services also include session state management. A session is defined as the time period that an end-user is continuously on a web site. If the end-user explicitly ends the session or is silent for a particular set time period (e.g., 20 minutes), a session is said to have ended. While an end-user is in a session, a state handler temporarily stores any data selected by the end-user (such as products in the shopping cart) in RAM (random access memory) for better performance.

A conventional method for managing session state is provided with Microsoft's IIS web server for ASP sessions. A session is created when an end-user first accesses a web page on a web site. Creation of the session results in a cookie (a text file) being stored on the client computer, which is then available for any application to use. As well, the web pages can create and use "session variables" to store data for use on any page (session state). The session variables stored are specific to the particular sessions. Other end-users or other sessions for the same end-user will have different session variables. But with this Microsoft technology, particular session variables can exist only on the server where they were created. Hence, when a web application is scaled by distributing it to multiple servers, particularly to accommodate high end-user access, this approach to maintaining session state does not work.

Nonetheless, in an embodiment in accordance with the invention, multiple web application servers are used and session state can be accessed from any server. In particular, session state in accordance with the invention stores a cookie that includes a session ID or user ID on the client computer to identify the session, much like that done conventionally. But unlike that done conventionally, in an embodiment of the present invention, session state is implemented as an NT service, which automatically starts upon system boot up. As an NT service, the session state service can be used remotely (from a different machine), allowing more than one application server to access one central session state. Thus, a business module object can place its data in a memory store which persists for the term of an end-user session allowing data to be quickly accessed from multiple servers between web pages during a session.

Administrative Support and Management Services

Foundation 110 further includes management services 122 (FIG. 1). Management services 122 is used for administrative activities performed by the user. In one embodiment, management services are accessed by the company-user using a browser. Management services 122 provides the administrative interfaces and services for each of the modules and foundation, including a number of configuration options, which are stored in the DIT. For instance, management services allows the company-user to select a search or map provider for use with a locate module and a fax provider for use with the transact module. Management services further allows for data management, including control of the database, that is needed to build and maintain catalog and product information. Many other administrative functions are available through the management services.

The DIT works in conjunction with management services storing administrative settings as discussed above. The DIT further stores validation data (used by the validator 308 (FIG. 3)) as well as the site server membership directory structure (for tracking end-users).

Figure 9:
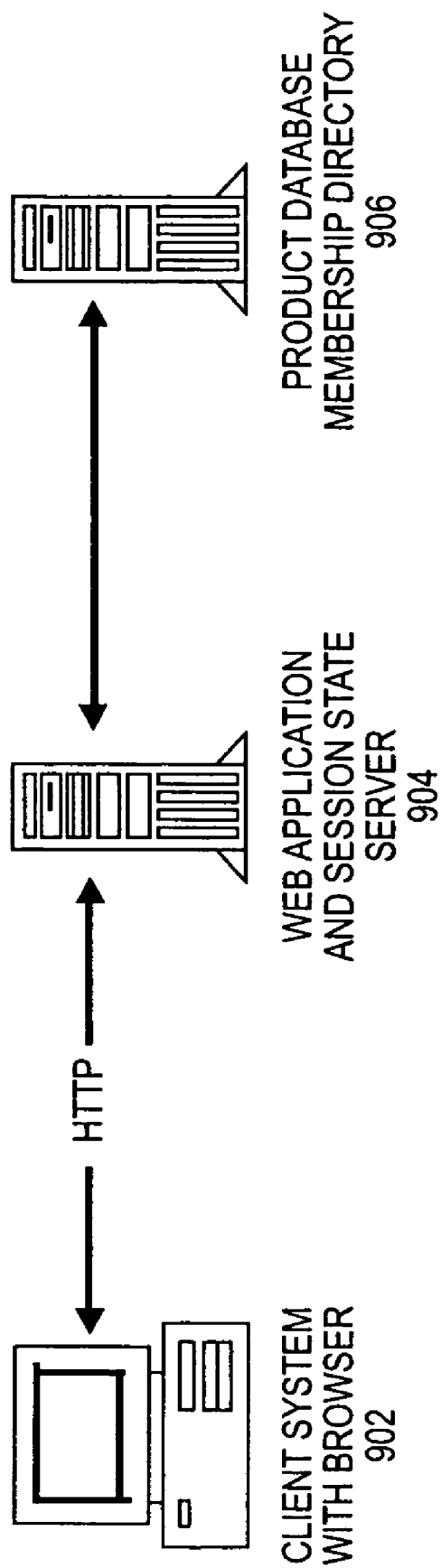
FIGS. 9 and 10 are generalized diagrams illustrating system scalability.
Figure 10:
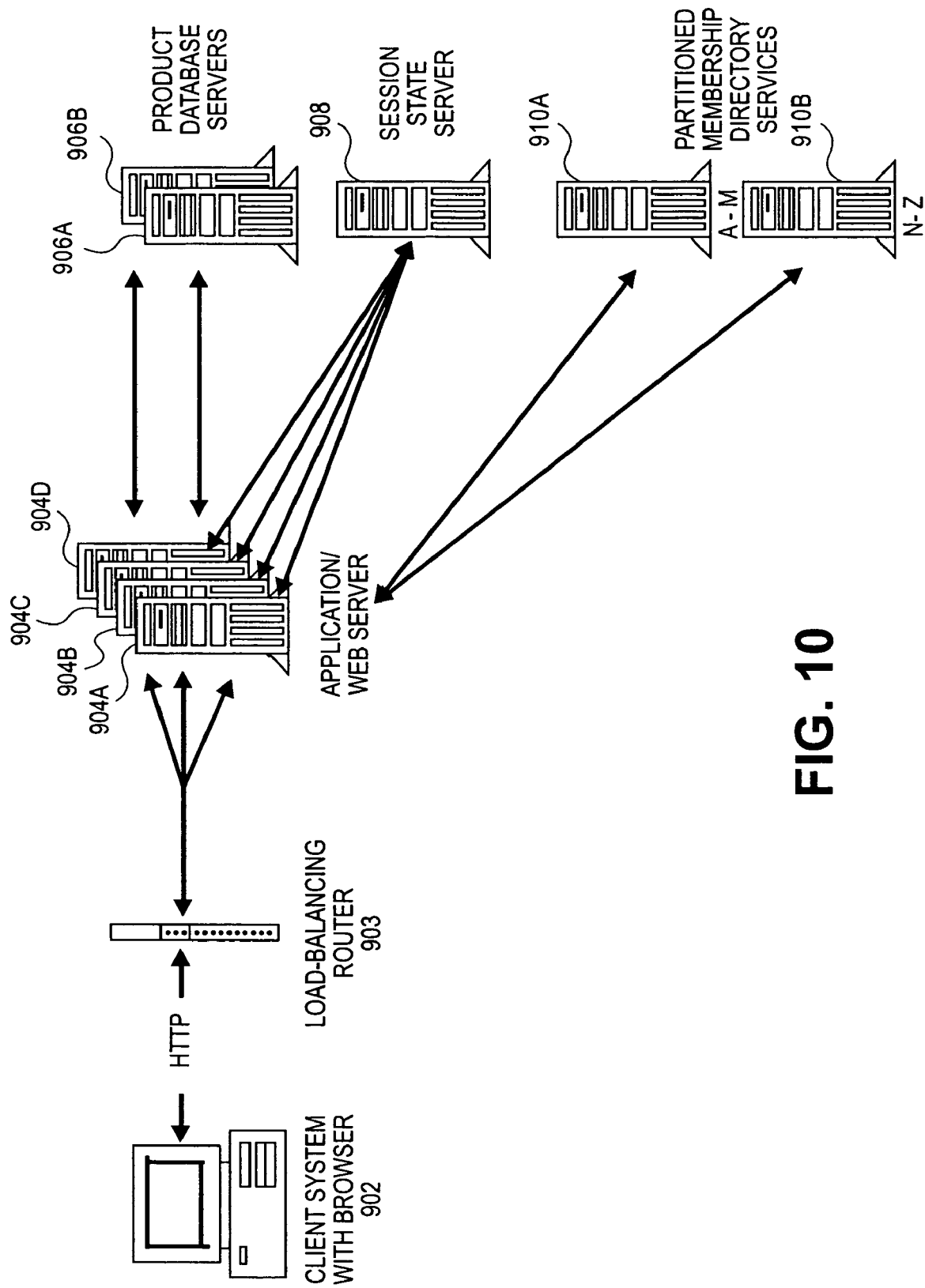

Scalability A system in accordance with the invention is also easily scalable. In one embodiment, as shown in FIG. 9, the system can be installed on one server 904 to support the web application (e.g., presentation services, business services, and data services shown in FIG. 2) and session state management while a second server 906 is used to support data storage (product database and membership directory). But in other embodiments, as shown in FIG. 10, many more servers may be used, depending on the company-user's needs and considering factors such as load balancing and security. As shown in FIG. 10, a load balancing router 903 is used, and one or more servers are used to separately support the web application (904a-d), the product database (906a-b), session state (908), and membership directory services (910a-b). Providing the ability to access session state from multiple machines (discussed previously) greatly enhances the scalability of the system.

E-Commerce Sales Model

Figure 11:
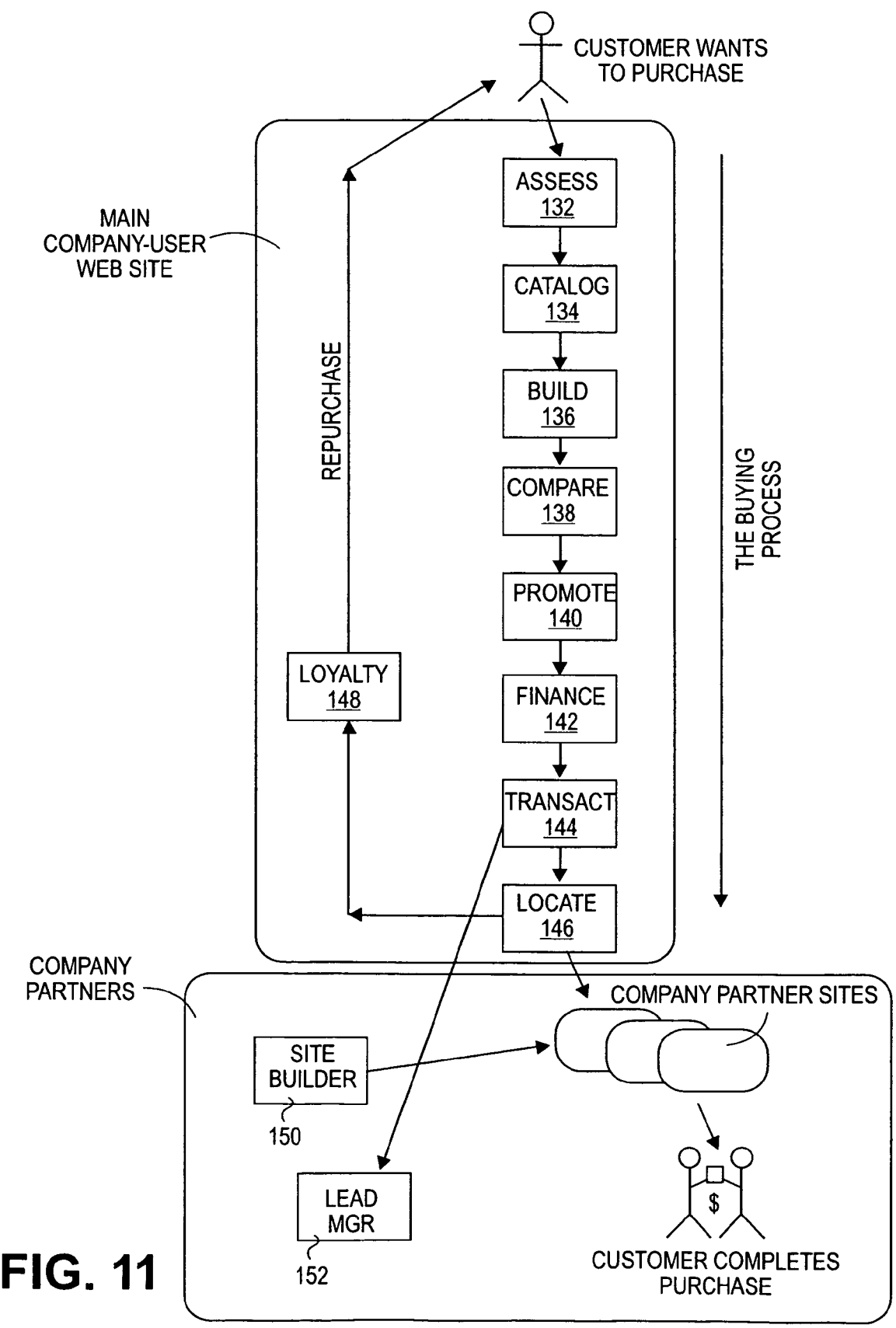
FIG. 11 is a block diagram illustrating how a system in accordance with the invention models a sales environment.

One embodiment of the invention is particularly useful for modeling a sales environment for e-commerce. As shown in FIG. 11, the modules 130 of FIG. 1 can be used to mimic a non-electronic sales process.

For instance, consider a hypothetical furniture purchase. When a customer walks into a furniture showroom, a sales person may interact with the customer, discuss the customer's available furnishable space and its planned use of the furniture. After those discussions, the salesperson may make a product recommendation. The assess module 132 operates in a similar fashion, interactively guiding an end-user to determine their product needs through a series of questions, choices, and rating scales and then displaying product recommendations that match the end-user's buying criteria. The access module 132 will frequently be used with rule engine 124.

Continuing the hypothetical purchase process, the customer may wish to view various pieces of furniture in the showroom, finding out dimensions, materials, and other relevant information. Similarly, the catalog module 134 operates to illustrate to an end-user product information, potentially including graphic images, media files, as well as descriptive text information.

In some situations, a customer may need a custom-designed piece of furniture. The build module 136 allows an end-user to interactively configure such a piece of furniture specific to their needs, preferences and budget, for instance in terms of fabric selection, dimensions, leg style, etc. The build module 136 guides the end-user through various options and ensures that the end-user chooses a product that conforms to engineering and manufacturing requirements. The build module 136 will frequently be used with rule engine 124.

In many instances, a customer will want to compare two or more products for characteristics, quality, price, etc. The compare module 138 allows an end-user to compare the features of multiple products from different companies or product lines. In other words compare module 138 allows for side-by-side comparison of the company-user's products and/or a competitor's products.

During the sales process, the sales person may mention to the customer that certain products are on sale or are associated with special promotions. The promote module 140 operates in the same way, allowing end-users to view sales, rebates, incentives, offers, and promotions on-line.

A customer seriously interested in making a furniture purchase may be offered credit or a financing package by the sales person. In a similar manner, the finance module 142 gives an end-user the ability to apply for credit or to calculate various financing scenarios. For instances, the finance module 142 allows an end-user to apply for credit approval, perform "what if" calculations (such as varying price, down payment, and finance terms), and perform lease versus finance comparisons.

Once a customer is ready to make a purchase, a sales transaction occurs. In the on-line environment created by an embodiment of the invention, a similar transaction takes place. In some embodiments, such a transaction may be carried out simply by the end-user's supplying a credit card. In other embodiments, however, the transact module 144 forwards the end-user's information and product selection to an associated company partner. To do so, transact object consults the cart object for the selected products, company partner, and end-user information. If any information is missing, transact initiates the process for selecting one, e.g., by returning a request to initiate the appropriate modules. The transact module further obtains the end-user's information from a data store. If no information yet exists, a template (customized by the company-user) is provided to the end-user to fill in the required information. The information is forwarded to the selected associated company partner by e-mail, fax, or XML document. In this way a company can do business on-line but maintain its current business model without disintermediating its company partners.

The locate module 146 allows the end-user to select which company partner will be contacted by the transact module 144. Such selection can take place by identifying a retailer name, zip code, or other information and, in some embodiments, interfacing with a geo-mapping service to provide specific location information. The end-user and selected company partner then finalize the purchase.

In some embodiments of the invention, end-user loyalty is promoted using a loyalty module 148. The loyalty module increases end-user loyalty through relationship building activities. Such activities include providing an end-user with personalized buying opportunities, appropriately timed maintenance reminders, and service offerings. The loyalty module 148 will also in some embodiments include e-mail subscriptions, a secure environment for end-user interactions (e.g., with password protection), on-line access to documentation such as manuals and warranties, and chat capabilities. In some embodiments, access to the loyalty features will be available for "members only." That is, access to the loyalty features is controlled by a login process. A membership management system is utilized to trace and maintain information about "members" and to allow for the creation of new members. In some embodiments, such a membership management system is based on Microsoft Site Server 3.0 Membership Authentication Mode HTML Forms Authentication Method. In some embodiments the information provided to members by loyalty module will also be personalized—i.e., geared specifically to the member end-user based on stored information about the end-user.

Other business modules 154 performing other functions can also be incorporated. Thus, there are limitless possibilities to the types of modules that could be used. For instance, a module 130 could be developed to support travel agency-type applications, applications for financial or investment institutions, or an infinite number of others.

Some embodiments of the invention may use less than all of the modules as shown in FIG. 11. For instance, a useful embodiment of the invention will use only the catalog, transact, and locate modules.

Some embodiments of the invention further enable a main company-user site as well as affiliated sites managed by associated company partners. The site builder module 150 allows the associated company partner to easily build sites with unique domain names that are approved by the main company-user. The main company site may be supported by different modules than the affiliated sites. For instance, the main company site may use the catalog, build, transact, and locate modules while the affiliated sites use only the transact and build modules.

Some embodiments of the invention further provide company partners with a lead manager module 152. Lead manager module 152 assists company partners in tracking and managing sales leads as they are delivered from the main company-user web site.

Thus, a system has been described that provides highly modular, easily modifiable e-commerce software. Each system can be customized by a company-user in terms of function and look and feel, yet the system does not need to be built from scratch. In other words, a user is provided with a prebuilt, yet customizable system that avoids the need to purchase an expensive custom system or an inflexible shrink-wrapped system.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A computer implemented system, with business modules executing on at least one processor of the computer implemented system, for providing a web site, comprising:
at least one processor configured to execute a set of business modules from a plurality of business modules selected by a company-user;
a storage medium embodying the plurality of business modules and a plurality of data services components;
wherein the plurality of data services components retrieve and save data for the business modules from and to persistent data storage;
wherein each business module provides a respective function;
wherein each business module is associated with a respective plurality of templates, wherein a set of templates is selectable by a company-user from each respective plurality of templates;
wherein each business module is associated with a respective plurality of rules, wherein said rules are developed by the company-user;
wherein said templates control the functionality performed by the system and the display of information by the system;
wherein said templates are customizable to display graphical elements selected by the company-user;
wherein said rules personalize the system to perform in ways unique to each company-user;
wherein the business modules and data services components are executed on the at least one processor of the computer implemented system;
wherein said computer implemented system comprises a foundation, wherein said foundation: (a) is configured to interact with a web browser, (b) serves as an interface between each of the business modules and the web browser, and (c) interacts with any of the plurality of business modules such that, at least one, additional selected business modules can be added to the system and selected business modules can be subtracted from the system;
wherein upon receiving a request from the web browser, the foundation invoke invokes the business module appropriate to the request to carry out the request by, at least one of, (a) storing request parameters in a context object, where the parameters include an identification of the specific business module, (b) consulting the context object for the identification of the specific business module, and (c) invoking the business module that is identified by the identification;
wherein the foundation comprises a response loop, wherein said response loop, (a) processes the request, (b) selects an appropriate business module to carry out the request whose functionality correlates to the request, and (c) generates an appropriate responsive web page display to an end-user through the web browser;
wherein the response loop further comprises a facilitator object that (a) receives the request, (b) creates the context object, and (c) passes the context object to a dispatcher;
wherein said dispatcher (a) takes the context object and invokes a validator object, wherein said validator object validates the information contained in the context object, and (b) invokes a business object factory;
wherein said business object factory (a) consults the context object to determine the type of business module required, and (b) instantiates a business object that corresponds to the appropriate business module;
wherein said business object (a) obtains the data from the persistent data storage, (b) converts the retrieved data into XML format, (c) invokes a page generator, and (d) sends the XML data to said page generator;
wherein said page generator (a) consults the context object to obtain an XSL style sheet, (b) combines the retrieved XSL style sheet with the SML data to produce an HTML web page, and (c) stores the HTML web page in the context object; and
wherein the HTML web page is output to the web browser using said facilitator object.

2. The system of claim 1, wherein each template is a generic web page that is associated with at least one command that executes as a result of input received from an end-user.

3. The system of claim 1, wherein said plurality of business modules includes:
a catalog module designed to display product information;
a transact module designed to facilitate purchasing transactions; and
a locate module designed to identify a sales location.

4. The system of claim 3, wherein said plurality of business modules further includes at least one of:
an assess module designed to assess a end-user's needs;
a build module designed to enable the end-user to interactively design products specific to the end-user's needs;
a compare module designed to allow the end-user to compare a plurality products;
a promote module designed to allow the end-user to view promotional information;
a finance module designed to provide financing information to the end-user;
a lead manager module designed to allow sales leads management;
a loyalty module designed to provide relationship building activities with the end-user; and
a site builder module designed to allow a partner of the company-user to build a company-user-approved website.

5. The system of claim 1, wherein the plurality of business modules includes:
a loyalty module designed to provide relationship building activities with an end-user including one or more of the following services:
membership services;
personalized information services;
personalized buying opportunity services;
e-mail subscription services;
on-line access to documentation services; and
chat services.

6. The system of claim 1, wherein the set of business modules selected includes all of the business modules in said plurality of business modules.

7. The system of claim 1, wherein each business module operates independently of the other business modules, but a particular business module still receives information that was generated by another business module.

8. A computer implemented system, with business modules executing on at least one processor of the computer implemented system, for providing a web site, comprising:
at least one processor; configured to execute a set of business modules selected by a company-user;
a storage medium embodying the set of business modules and a plurality of data services components;

wherein the plurality of data services components retrieve and save data for the business modules from and to persistent data storage;

wherein each business module provides a respective function;

wherein each business module is capable of performing a plurality of commands related to its function and is customizable to perform a set of those commands selected by the company-user;

wherein each business module is associated with a plurality of generic web pages that are customizable to have a look and feel selected by the company-user;

wherein each business module is associated with a plurality of rules that are developed by the company-user to personalize the system to perform in ways unique to each company-user;

wherein the business modules and data services components are executed on the at least one processor of the computer implemented system;

wherein said computer implemented system comprises a foundation, wherein said foundation (a) is configured to interact with a web browser, (b) serves as an interface between each of the business modules and the web browser, and (c) interacts with any of the plurality of business modules such that, at least one, additional selected business modules can be added to the system and selected business modules can be subtracted from the system;

wherein upon receiving a request from the web browser, the foundation invokes the business module appropriate to the request to carry out the request by (a) storing request parameters in a context object, where the parameters include an identification of the specific business module, (b) consulting the context object for the identification of the specific business module, and (c) invoking the business module that is identified by the identification;

wherein the foundation comprises a response loop, wherein said response loop (a) processes the request, (b) selects an appropriate business module to carry out the request whose functionality correlates to the request, and (c) generates an appropriate responsive web page display to an end-user through the web browser;

wherein the response loop further comprises a facilitator object that (a) receives the request, (b) creates the context object, and (c) passes the context object to a dispatcher;

wherein said dispatcher (a) takes the context object and invokes a validator object, wherein said validator object validates the information contained in the context object, and (b) invokes a business object factory;

wherein said business object factory (a) consults the context object to determine the type of business module required, and (b) instantiates a business object that corresponds to the appropriate business module;

wherein said business object (a) obtains the data from the persistent data storage, (b) converts the retrieved data into XML format, (c) invokes a page generator, and (d) sends the XML data to said page generator;

wherein said page generator (a) consults the context object to obtain an XSL style sheet, (b) combines the retrieved XSL style sheet with the SML data to produce an HTML web page, and (c) stores the HTML web page in the context object; and wherein the HTML web page is output to the web browser using said facilitator object.

9. The system of claim 8, wherein each generic web page is associated with at least one of said commands, wherein the selected set of commands is selected by selecting a set of generic web pages.

10. The system of claim 8, wherein the generic web pages are customizable to have a look and feel selected by a company-user by changing any of the following: titles, buttons, fonts, and colors.

11. The system of claim 10, wherein the generic web pages are further customizable to have a look and feel selected by a company-user by adding graphics and media.

12. The system of claim 8, wherein said set of business modules includes:
a catalog module designed to display product information;
a transact module designed to facilitate purchasing transactions; and
a locate module designed to identify a sales location.

13. The system of claim 12, wherein said set of business modules further includes at least one of:
an assess module designed to assess a end-user's needs;
a build module designed to enable the end-user to interactively design products specific to the end-user's needs;
a compare module designed to allow the end-user to compare a plurality products;
a promote module designed to allow the end-user to view promotional information;
a finance module designed to provide financing information to the end-user;
a lead manager module designed to allow sales leads management;
a loyalty module designed to provide relationship building activities with an end-user; and
a site builder module designed to allow a partner of the company-user to build a company-user-approved website.

14. The system of claim 8, further including a second set of business modules used by a partner of the company-user, wherein the second set of business modules includes a site builder module designed to allow the partner to build a company-user-approved web site.

15. The system of claim 8, further including a loyalty module designed to provide relationship building activities with an end-user including one or more of the following services:
membership services;
personalized information services;
personalized buying opportunity services;
e-mail subscription services;
on-line access to documentation services; and
chat services.

16. A computer implemented system, with business modules executing on at least one processor of the computer implemented system, for providing a web site, comprising:
at least one processor configured to execute a set of business modules from a plurality of business modules selected by a company-user;
a storage medium embodying the plurality of business modules and a plurality of data services components;
wherein the plurality of data services components receive and save data for the business modules from and to persistent data storage;
wherein each business module provides a respective function;
wherein each business module is associated with a respective plurality of templates, wherein a set of templates is selectable by a company-user from each respective plurality of templates;

wherein said templates control the functionality performed by the system and the display of information by the system;

wherein said templates are customizable to display graphical elements selected by the company-user;

wherein the business modules and data services components are executed on the at least one processor of the computer implemented system;

wherein said computer implemented system comprises a foundation, wherein said foundation (a) interacts with a web browser, (b) serves as an interface between each of the business modules and the web browser, and (c) interacts with any of the plurality of business modules such that, at least one of, additional selected business modules can be added to the system and selected business modules can be subtracted from the system;

wherein upon receiving a request from the web browser, the foundation invokes the business module appropriate to the request to carry out the request by (a) storing request parameters in a context object, where the parameters include an identification of the specific business module, (b) consulting the context object for the identification of the specific business module, and (c) invoking the business module that is identified by the identification;

wherein the foundation comprises a response loop, wherein said response loop (a) processes the request, (b) selects an appropriate business module to carry out the request whose functionality correlates to the request, and (c) generates an appropriate responsive web page display to an end-user through the web browser;

wherein the response loop further comprises a facilitator object that (a) receives the request, (b) creates the context object, and (c) passes the context object to a dispatcher; and wherein said dispatcher (a) takes the context object and invokes a validator object, wherein said validator object validates the information contained in the context object, and (b) invokes a business object factory.

17. The system of claim 16, wherein said Business Object Factory can: (a) consult the context object to determine the type of business module required, and (b) instantiate a business object that corresponds to the appropriate business module; and wherein said business object can: (a) obtain the data from the persistent data storage, (b) convert the retrieved data into XML format, (c) invoke a page generator, and (d) send the XML data to said page generator.

18. The system of claim 17, wherein said page generator can: (a) consult the context object to obtain an XSL style sheet, (b) combine the retrieved XSL style sheet with the SML data to produce an HTML web page, and (c) store the HTML web page in the context object; and wherein the HTML web page is output to the web browser using said facilitator object.

19. A computer implemented system, with business modules executing on at least one processor of the computer implemented system, for providing a web site, comprising:

at least one processor configured to execute a plurality of business modules;

a storage medium embodying the plurality of business modules and a plurality of data services components;

wherein the plurality of data services components receive and save data for the business modules;

wherein each business module provides a respective function;

wherein said computer implemented system comprises a foundation, wherein said foundation (a) is configured to interact with a web browser, (b) serves as an interface between each of the business modules and the web browser, and (c) interacts with any of the plurality of business modules such that, at least one, additional selected business modules are added to the system and selected business modules can be subtracted from the system;

wherein upon receiving a request from the web browser, the foundation invokes the business module appropriate to the request to carry out the request by (a) storing request parameters in a context object, where the parameters include an identification of the specific business module, (b) consulting the context object for the identification of the specific business module, and (c) invoking the business module that is identified by the identification;

wherein the foundation comprises a response loop, wherein said response loop (a) processes the request, (b) selects an appropriate business module to carry out the request whose functionality correlates to the request, and (c) generates an appropriate responsive web page display through the web browser;

wherein the response loop further comprises a facilitator object that (a) receives the request, (b) creates the context object, and (c) passes the context object to a dispatcher;

wherein said dispatcher (a) takes the context object and invokes a validator object, wherein said validator object validates the information contained in the context object, and (b) invokes a business object factory;

wherein said business object factory (a) consults the context object to determine the type of business module required, and (b) instantiates a business object that corresponds to the appropriate business module;

wherein said business object (a) obtains the data from the persistent data storage, (b) converts the retrieved data into XML format, (c) invokes a page generator, and (d) sends the XML data to said page generator;

wherein said page generator (a) consults the context object to obtain an XSL style sheet, (b) combines the retrieved XSL style sheet with the SML data to produce an HTML web page, and (c) stores the HTML web page in the context object; and wherein the HTML web page is output to the web browser using said facilitator object.

20. A computer implemented system, with business modules executing on at least one processor of the computer implemented system, for providing a web site, comprising:

at least one processor configured to execute a plurality of business modules;

a storage medium embodying the plurality of business modules and a plurality of data services components;

wherein the plurality of data services components retrieve and save data for the business modules;

wherein each business module provides a respective function;

wherein said computer implemented system comprises a foundation, wherein said foundation (a) interacts with a web browser, (b) serves as an interface between each of the business modules and the web browser, and (c) interacts with any of the plurality of business modules such that, at least one, additional selected business modules can be added to the system and selected business modules can be subtracted from the system;

wherein upon receiving a request from the web browser, the foundation invokes the business module appropriate to the request to carry out the request by (a) storing request parameters in a context object, where the parameters include an identification of the specific business module, (b) consulting the context object for the identification of the specific business module, and (c) invoking the business module that is identified by the identification;

wherein the foundation comprises a response loop, wherein said response loop (a) processes the request, (b) selects an appropriate business module to carry out the request whose functionality correlates to the request, and (c) generates an appropriate responsive web page display through the web browser;

wherein the response loop further comprises a facilitator object that (a) receives the request, (b) creates the context object, and (c) passes the context object to a dispatcher; and wherein said dispatcher (a) takes the context object and invokes a validator object, wherein said validator object validates the information contained in the context object, and (b) invokes a business object factory.

* * * * *